V. W. PAGÉ.
DRIVING MECHANISM.
APPLICATION FILED FEB. 14, 1913.

1,213,243.

Patented Jan. 23, 1917.
4 SHEETS—SHEET 1.

WITNESSES:

INVENTOR:
Victor W. Pagé,
BY
his ATTORNEY.

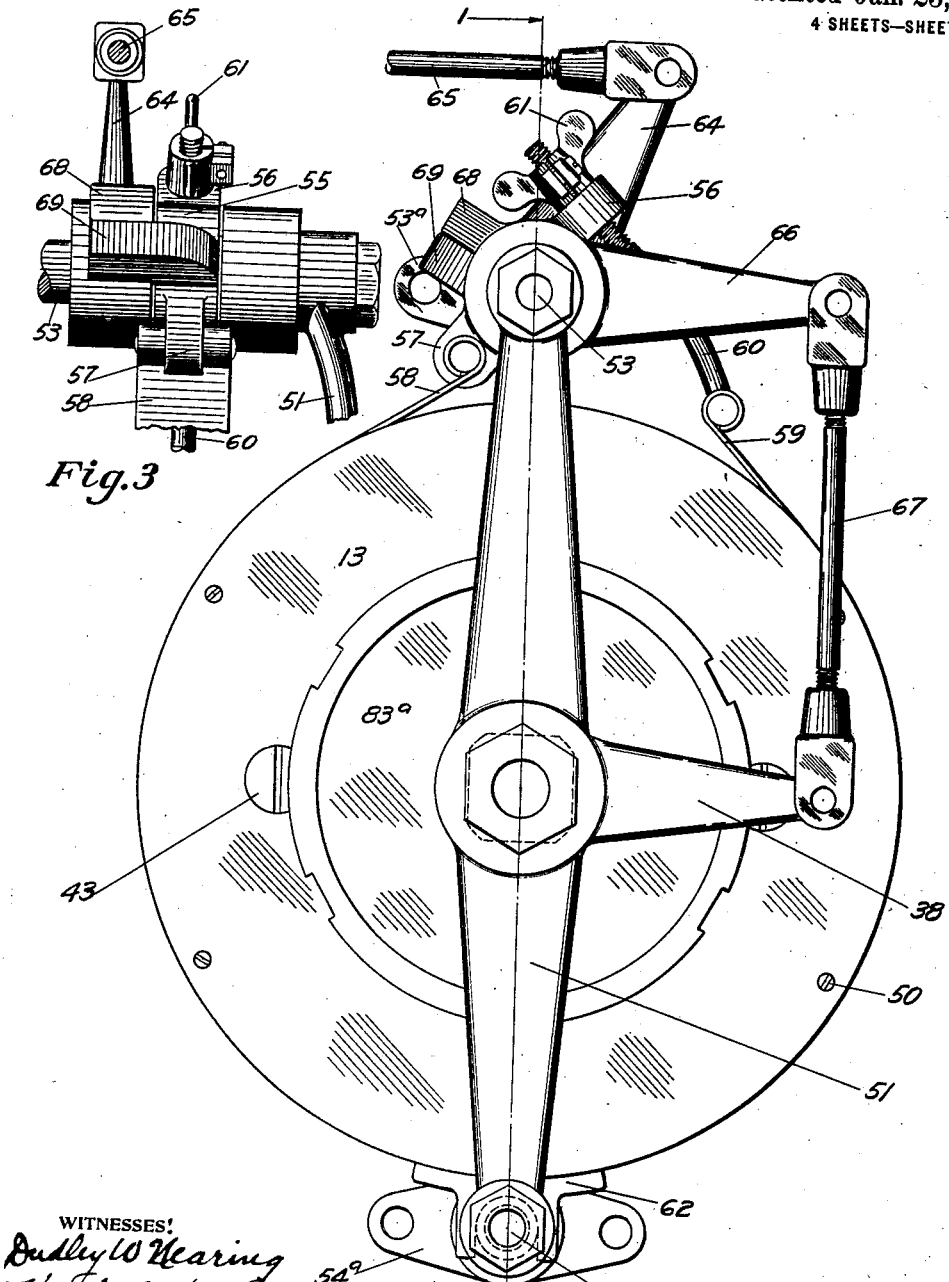

V. W. PAGÉ.
DRIVING MECHANISM.
APPLICATION FILED FEB. 14, 1913.

1,213,243.

Patented Jan. 23, 1917.
4 SHEETS—SHEET 3.

INVENTOR:
Victor W Pagé,

V. W. PAGÉ.
DRIVING MECHANISM.
APPLICATION FILED FEB. 14, 1913.

1,213,243.

Patented Jan. 23, 1917.
4 SHEETS—SHEET 4.

WITNESSES:

INVENTOR:
Victor W. Pagé,
BY
his ATTORNEY.

UNITED STATES PATENT OFFICE.

VICTOR W. PAGÉ, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

DRIVING MECHANISM.

1,213,243.  Specification of Letters Patent.  Patented Jan. 23, 1917.

Application filed February 14, 1913.  Serial No. 748,285.

*To all whom it may concern:*

Be it known that I, VICTOR W. PAGÉ, a citizen of the United States, residing at Bristol, county of Hartford, State of Connecticut, have invented a certain new and useful Driving Mechanism, of which the following is a full, clear, and exact description, such as will enable others skilled in the art to which it appertains to make and use the same, reference being had to the accompanying drawings, forming part of this specification.

My invention relates to driving mechanism and more particularly to pulleys and the like.

One object of my invention is to provide a pulley or the like capable of easy attachment to any of the usual forms of driving shaft and which will permit of the running of the engine free of the pulley rim and will also permit of a speed change between the shaft and the rim.

Another object is to provide a self-contained pulley or the like embodying a free engine clutch and a speed change gear.

Another object is to provide means for first freeing the clutch and then throwing in the speed change gear.

Another object is to provide a mechanism which, while strong and efficient, is simple and easy to assemble and operate.

To these ends and also to improve generally upon devices of the character indicated my invention consists in the following matters hereinafter described and claimed.

Figure 1:
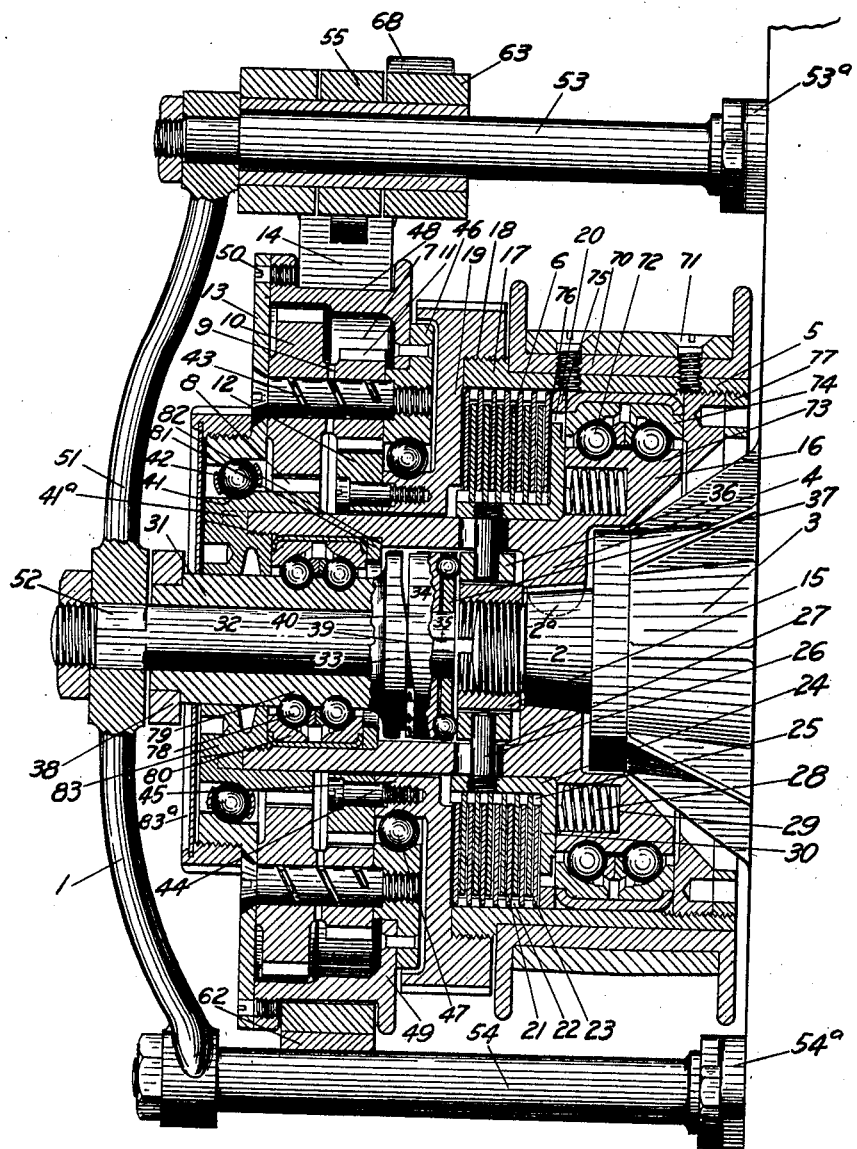
Figure 4:
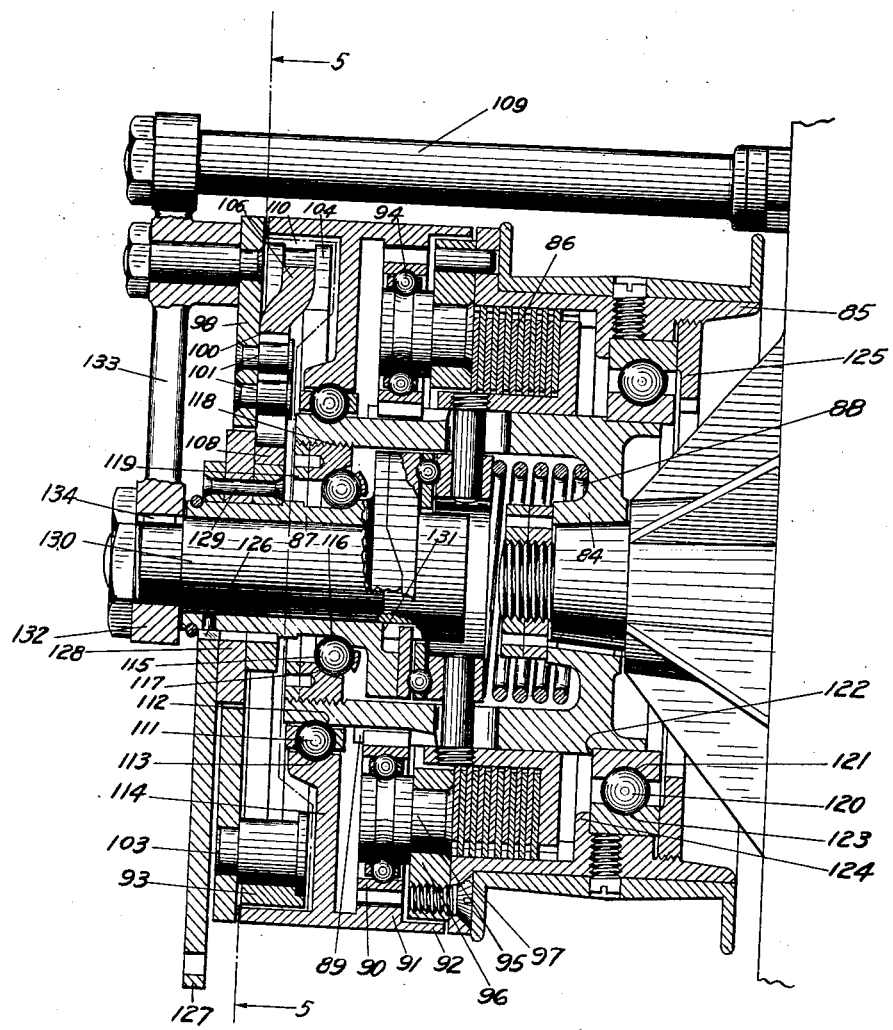
Figure 5:
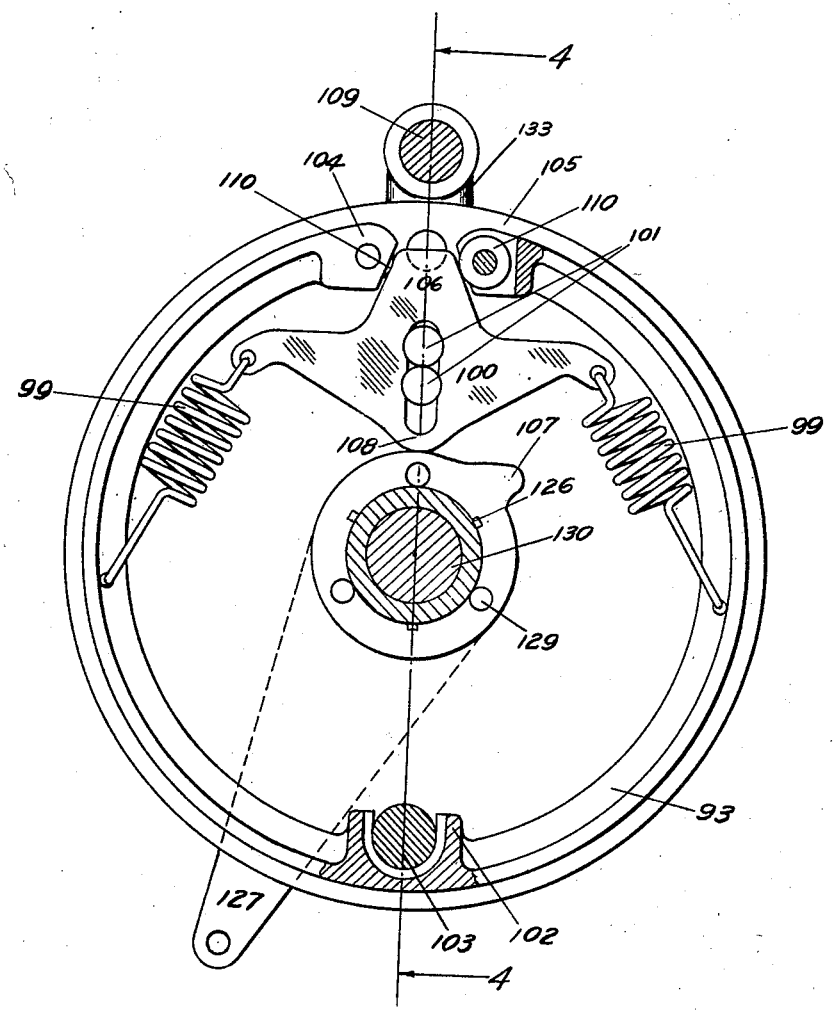

In the accompanying drawings:—Figure 1 is a longitudinal diametrical section of one embodiment of my invention substantially on line 1—1 of Fig. 2; Fig. 2 is an end view of the device illustrated in Fig. 1; Fig. 3 is a detail of the lost motion connection illustrated in Fig. 2; Fig. 4 shows an embodiment of my invention differing somewhat from the embodiment illustrated in Figs. 1, 2 and 3, being a longitudinal diametrical section on line 4—4 of Fig. 5; and Fig. 5 is a section substantially on line 5—5 of Fig. 4.

Referring more particularly to Figs. 1–3 inclusive, my invention is shown embodied in a pulley, designated generally as 1, adapted for attachment to a shaft, as 2, of the engine 3 of a motor bicycle or the like. The pulley 1 comprises, generally, a driving member or sleeve 4 for direct fast connection with and support by the engine shaft 2 and a driven traction member or rim 5 for connection with a belt or the like. The rim 5 is rotatably mounted with respect to the sleeve 4.

Between the sleeve and rim are arranged a direct driving connection and speed change driving connection. In the present instance the direct driving connection comprises a clutch, designated generally as 6, which, when active, directly connects members 4 and 5 and, when inactive, permits the sleeve and rim to run free of each other thereby to provide for a free engine or for the throwing in of the indirect driving connection.

The speed change driving connection, designated generally as 7, is shown as a planetary transmission of the so-called "all spur" type comprising a driving gear 8 fast with the sleeve 4, one or more double spur gears 9 each having one of its gears, as the larger 10, in mesh with the gear 8 and its other gear, as the smaller 11, in mesh with the driven gear 12 fast connected to the rim 5. The spur gears 9 are carried upon a rotatable carrier 13 which may be held from rotation as by a brake 14. Thus, in the above described mechanism, with the clutch 6 active and the carrier 13 free to rotate, the drive is direct and high speed from the sleeve 4 through the clutch 6 to the rim 5; with the clutch inactive and the carrier free the direct driving connection between the sleeve and rim is inactive and the engine free; with the clutch free and the carrier held from rotation the drive is indirect and slow speed from the gear 8 of the sleeve 4 through the gears 10 and 11 to the gear 12 and thence to the rim 5.

In the illustrated embodiment the sleeve 4 is directly and non-rotatably connected to the shaft 2 by being slipped over the tapered end thereof and held thereon by the nut 15 and the key 2ª. As here illustrated the sleeve 4 is provided with an outstanding portion 16 preferably in the form of a flange which for compactness may conveniently be set back to overhang the projecting bearing of the engine. Upon the flange 16 is shown, rotatably supported, the before referred to traction member, as the rim 5.

The rim 5 is provided with a portion 17 which overhangs a part of the sleeve 4 and such portion carries, preferably screwed thereon as indicated at 18, the abutment 19 preferably in the character of a plate which projects inward toward the sleeve 4. Thus there is provided between the rim and the sleeve an oil chamber 20 in which is conveniently received the before referred to clutch 6.

The clutch 6 is here shown as of the friction disk type and comprises a series of disks, as 21, slidably and non-rotatably connected to the rim, as by keying at 22, and a second series of disks, as 23, slidably and non-rotatably connected to the sleeve 4. This latter connection is preferably effected by means of the sleeve 24 to which the second series of disks is slidably and non-rotatably connected, as by keying at 25, and which sleeve is in turn slidably and non-rotatably connected to the sleeve 4. Preferably the sleeve 24 is connected to sleeve 4 by means of a series of pins, as 26, projecting into slots, as 27, in the sleeve 4.

The clutch 6 is, preferably, normally active and may be so maintained in any suitable manner as by the springs 28 carried in recesses 29 (which are in effect extensions of the chamber 20) in the wall of the flange 16 of the sleeve 4 and exerting their force against the clutch disks to force them toward the abutment 19. As here shown the springs are in contact with a flange 30 carried, as integrally, by the sleeve 24. It will be seen that the flange 30 and the springs rotate together so that there is no friction or wear therebetween. It will also be seen that the flange 30 is in effect an additional clutch disk but, being carried with the sleeve 24, is so placed as to be shifted against the tension of the springs to relieve the remainder of the disks from spring pressure when the sleeve 24 is shifted toward the springs.

Any suitable means for positively shifting the sleeve 24 may be provided. In the present instance there is provided a means for shifting the pins 26 in their slots to thereby shift the sleeve 24. Such means may comprise a sleeve 31 oscillatively mounted upon a suitable support, as the axle 32, and provided with a face cam 33. Adjacent the cam 33, and conveniently mounted upon the axle 32, is arranged a slidable and non-rotatable ring 34 which may be attached to the axle, as by squaring at 35. The connection between the ring 34 and the pins 26 is preferably by means of the annulus 36, carried by the pins, and the interposed slidably and rotatably mounted ball-thrust 37. The sleeve 31 may be conveniently oscillated by the arm 38 rigidly attached thereto as by squaring.

It will be seen that, in the above recited construction, when the sleeve 31 is oscillated to bring the high portion 39 of the cam 33 into contact with the corresponding high portion 40 of the ring 34 the ring will travel along the axle 32 toward the right (as the parts are illustrated in Fig. 1) to thereby force the sleeve 24 toward the springs 28 and thus release the clutch. Preferably, and as shown, the high portions are of considerable extent whereby after the clutch has been relieved further oscillation of the sleeve will have no other effect than the holding of the clutch released.

It will be seen that the longitudinally shiftable ring 36 has radial clearance with respect to the fastening device, or nut, 15 and the shaft 2. This is conducive to compactness as it permits the end of the shaft, the nut, and the ring to be closely housed in the chamber of the driving member 4, since the ring can overlie the nut and the shaft in its shifting movements.

In the illustrated embodiment the slow speed change drive from the driving member 4 to the rim 5 is effected by the before referred to gears 8, 10, 11 and 12 respectively. The gear 8 may conveniently, and as here shown, be formed integrally with the inner race member 41 of the antifriction bearing 42 which serves to antifrictionally support the carrier 13 upon the sleeve 4. In this construction the key 41ª for the race member also serves to prevent rotation of the gear on the sleeve 4. The double spur gears 9 are shown as mounted upon the carrier 13 by means of the spindles 43. The gear 12 is shown as rigidly attached, as by screws 44, to the extension 45 of the abutment 19. In this way the abutment is made to serve not only as an abutment but also as a gear support. Preferably the carrier 13 and the spindles 43 are additionally supported by the ring member 46 to which the pins 43 are screwed and which is antifrictionally supported upon the extension 45 by the antifriction bearing 47. The inner and outer race members of the bearing 47 may be conveniently provided as integral parts of the extension and of the ring respectively. It will be seen that member 19 serves as a race member as well as an abutment and a gear support thus tending to simplicity and compactness.

In order to provide an oil and protecting chamber for the reception of the double spur gears 9, the carrier 13 preferably carries the wall member 48 which is shown as extending generally parallel to the spindles 43 and having an inwardly extending flange 49 in contact with the ring 46. The wall member 48 is shown as connected to the carrier 13 by means of screws 50 and to the ring 46, as by rivets. Evidently the ring 46 serves not only as a support but also as a wall of the gear chamber.

The axle 32 is here shown as held against rotation by means of the anchor plate 51 non-rotatably attached to the axle, as by being squared thereon as indicated at 52, and having its arms supported by the posts 53 and 54 respectively, adapted for rigid connection with the engine frame. This latter connection may be effected by foot pieces 53ᵃ and 54ᵃ threaded to the posts and designed for direct attachment to the engine.

The carrier 13 may be held from rotation, in order to throw in the speed change drive, by any suitable means. As here shown there is provided the before referred to brake 14 conveniently mounted for braking contact with the outer surface of the wall member 48. The brake may be mounted and operated in any suitable manner. In this way the member 48 serves not only as a wall of the gear chamber but also provides a braking surface.

In the illustrated embodiment the brake 14, in the character of a flexible band, substantially surrounding the wall member 48, is supported from the collar 55 oscillatively mounted upon the post 53. The collar 55 is provided with substantially diametrically opposite arms 56 and 57 respectively to which the brake band is connected as by having one of its ends, as 58, directly pivoted to the lower arm 57 and its other end, as 59, connected to the upper arm by the T bolt 60 to which the brake is pivoted. The T bolt may be adjusted by means of its thumb nut 61 to vary the initial tension of the brake band.

Substantially diametrically opposite the collar 55 the brake band is preferably guided and held in position by the jawed lug 62 carried by the brake band and receiving between its jaws the post 54. Evidently upon oscillation of the collar 55 counter-clockwise (as the parts are shown in Fig. 2) the brake band will be drawn against the braking surface of the wall member 48 substantially throughout the length of its periphery and the braking force will be applied in proportion to the degree of oscillation.

Preferably there is provided a common means for first releasing the clutch 6 (to render inactive the direct driving connection) and then applying the brake to throw in the indirect speed change driving connection, and any suitable means may be employed for this purpose. A convenient and preferable means, that here shown, comprises a bell crank lever 63, conveniently carried upon the post 53, and having one of its arms, as 64, under the control of the operator, as by the link 65 pivoted thereto, and having its other arm, as 66, connected, as by the link 67, to the operating arm 38 of the sleeve 31, such link being pivoted at its respective ends to the arms. The bell crank lever is provided with a contact element, shown as a lug 68, and the collar 55 is provided with a corresponding lug 69, the two lugs projecting toward each other and into a common path but being so spaced circumferentially that when the parts are in initial position the lugs are spaced apart a sufficient distance to permit of a considerable movement of the bell crank before they are brought into contact. This space is sufficient to provide for the release of the clutch before the lugs are brought into contact. Upon contact of the lugs any further forward movement of the bell crank will cause a corresponding forward movement of the collar 55 whereby to apply the brake, the clutch meanwhile being held inactive. Conveniently, and as here shown, the collar 55 is rotatably mounted upon and about the hub of the bell crank, whose arms may be rigidly attached to its hub in any suitable manner, as brazing, after the assembly of the hub and collar.

The pulley rim 5 may conveniently be provided with a removable face member 70 detachably held to the rim proper as by screws 71. This arrangement provides for the easy substitution of different pulley faces should one become worn or one of different construction or contour be desired. Preferably, and as here shown, the pulley rim is carried upon the driving member 4 by an antifriction bearing, such for example as the bearing 72 of the combined radial and thrust type. Conveniently the flange 16 provides, integrally therewith, the inner race member 73 of the bearing 72. The outer race member 74 of the bearing may be held in position by the ring 75 abutting the shoulder 76 and by the ring 77 threaded to the rim.

The driving member 4 may, if desired, have a support additional to that provided by the shaft 2 as by being partially supported upon the axle 32, as by the combined radial and thrust bearing 78. The inner race member 79 of this bearing is conveniently provided by the oscillative sleeve 31, resulting in compactness. The outer race member 80 of the bearing may conveniently be held in position by the washer 81 abutting the shoulder 82 of the sleeve 4 and by the ring 83 threaded to the sleeve 4. Preferably, and as here shown, the ring 83 abuts with its tapered surface the sleeve 4 and the key 41ᵃ, whereby the ring serves not only to hold the race member 80 in position but also to hold the member 41 and gear 8 in position. If desired a dust cap 83ᵃ may be carried by the member 13 as shown.

In Figs. 4 and 5 there is shown an embodiment of my invention in which the indirect drive is effected by a planetary transmission of the so-called "internal gear" type.

The embodiment of Figs. 4 and 5 is essentially similar to that of Figs. 1 to 3 being provided with a driving member 84 for attachment to the shaft of the engine, the rim section 85, the releasable clutch 86, and the oscillative cammed sleeve 87 for releasing the clutch. The coöperating cams are preferably similar to those previously described. The clutch is maintained active by the spring 88 instead of by the plurality of springs 28 of the previously described embodiment. By the use of the single spring in alinement with the sleeve 87 the thrust tending to compress the spring is transmitted in a straight line to the spring. The slow speed drive is effected by means of planetary gearing the center gear 89 of which is fast connected with the driving member, the planet gears 90 of which are rotatably connected with the rim portion for movement therewith and the outer internal gear 91 of which is carried by the shell 92 rotatably mounted with respect to the driving member and the rim portion. The shell, when it is desired to throw in the slow speed driving connection, may be held stationary by the brake 93. In this construction with the clutch 86 active and the shell 92 free to rotate the drive is direct through the clutch; with the clutch released and the shell free to rotate the sleeve 84 and rim 85 are free each of the other whereby the engine may run free; and with the clutch released and the shell held from rotation the drive is indirect, the gear 89 causing the planet gears 90 to rotate upon their axes and, since the shell is stationary, to travel on the gear 91 carrying with them the rim 85. The planet gears are shown as antifrictionally mounted by bearings 94 upon spindles 95 mounted in an abutment ring 96 carried by the rim as by being connected thereto by screws 97. The brake 93 for the shell may be of any suitable construction. As here shown it is an expansible band arranged within the shell and in position to be expanded into braking contact with a portion of the inner surface thereof. This band, generally circular in character, is carried upon a carrier plate 98 as by being connected thereto by the springs 99. These springs are connected at one end to the brake and at their opposite ends to the shiftable spreader plate 100. The latter, in turn, is mounted upon the carrier plate 98 as by means of the pin and slot connection 101. The brake is also connected with the carrier plate by means of the jawed lug 102 upon the brake and the pin 103 upon the carrier. The brake is provided with spaced ends 104 and 105 respectively, preferably substantially diametrically opposite the jawed lug. The wedge shaped nose portion 106 of the spreader 100 rests between the spaced ends 104 and 105. It will be seen that when the spreader is moved upward (as the parts are illustrated in Fig. 5) the ends of the brake band are spread apart, the jawed lug slides downward on the pin 103 and substantially the entire brake is forced into contact with the surface of the shell 92. Any suitable means for actuating the spreader 100 may be used. Preferably, and as here shown, the oscillative sleeve 87 carries a cam 107 arranged for contact, with its nose, with the nose 108 upon the spreader. Thus when the sleeve is oscillated sufficiently the cam 107 shifts the spreader upward and spreads the band ends.

It will be seen that, in the above recited construction the springs 99 serve not only to yieldingly support the brake and assist to hold it contracted with its ends in connection with the spreader but also exert their force to hold the nose portion 108 in contact with the cam 107.

The cam 107 is preferably so located upon the sleeve 87 that its nose will not act to shift the spreader until after the clutch has been released and the higher portions of the sleeve-shifting cams are in position to travel upon each other with no other effect than the holding of the clutch released. Provision is thus made for the releasing of the clutch prior to the throwing in of the slow speed driving connection.

The carrier plate may be non-rotatably supported as by the arm 109 adapted for fast attachment to the engine frame. If desired the spaced ends 104 and 105 may be provided with antifriction rollers 110. The shell 92 may conveniently be supported upon the sleeve 84 by means of the radial and thrust antifriction bearing 111 having its inner race 112 formed upon the sleeve and its outer race 113 formed upon an inwardly projecting partition 114 of the shell.

The sleeve 84 may be supported by the radial and thrust antifriction bearing 115 having its inner race 116 provided by the oscillative sleeve 87 and its outer race 117 connected to the sleeve 84 by being threaded thereto, as indicated at 118, and by the check nut 119. The rim 85 may be antifrictionally mounted upon the sleeve 84 as by means of the combined radial and thrust bearing 120 having its inner race member 121 abutting a shoulder 122 and its outer race member 123 abutting a shoulder 124. Both race members may be held in place by a ring 125.

The cam 107 is fixed upon the oscillative sleeve by means of a key 126. The sleeve may be oscillated by means of the arm 127 rigidly attached thereto as by the key 126. The cam and lever are shown as spaced apart by the spacer 128 to which the lever and cam are connected by the pins 129.

Movement of the oscillative sleeve 87 longitudinally of the axle 130 upon which it is mounted may be prevented by the shouldered portion 131 of the axle and by the central portion 132 of the anchor plate 133. The anchor plate is shown as keyed to the axle at 134 and rigidly connected to the arm 109 as indicated.

It will be seen that I have provided a device such as a pulley, which will permit of the drive shaft running free; which provides a plurality of speeds, in which neither driving connection can be thrown in while the other is active and which withal is easily attachable to any of the usual forms of drive shaft, and is simple and comparatively inexpensive, and also one in which the traction member, and the two drives are supported and held assembled upon a single member, as the driving member, which may be detachably and easily connected to the driving shaft.

Having thus described my invention, what I claim as new and desire to secure by Letters Patent is:—

1. In a device of the character indicated, a driving member, a traction member rotatively supported thereon and having a portion overhanging and spaced from said driving member and rigidly carrying an annular abutment upon said overhanging portion to provide a driving connection chamber, a driving connection for connecting said members and secured within said chamber, a rotatable carrier upon said driving member and spaced therealong from said abutment, and a second driving connection for connecting said members and located longitudinally of said driving member between said carrier and abutment with said carrier carrying a portion of said second named driving connection and said abutment carrying another portion of such driving connection; substantially as described.

2. In a device of the character indicated, a driving member, a traction member rotatably supported thereon and having a portion overhanging and spaced from said driving member and rigidly carrying an annular abutment upon said overhanging portion to provide a clutch chamber, a direct drive clutch for connecting said members and secured within said chamber, a rotatable carrier upon said driving member and spaced therealong from said abutment, and a speed change drive for connecting said members and located longitudinally of said driving member between said carrier and abutment with said carrier carrying a portion of said drive and said abutment carrying another portion of said drive; substantially as described.

3. In a device of the character indicated, a driving member, a traction member rotatably supported thereon and having a portion overhanging and spaced from said driving member and rigidly carrying an annular abutment upon said overhanging portion to provide a clutch chamber, a controllable direct drive clutch for connecting said members and secured within said chamber; a rotatable carrier upon said driving member and spaced therealong from said abutment, a controllable speed change drive for connecting said members and located longitudinally of said driving member between said carrier and abutment with said carrier carrying a portion of said drive and said abutment carrying another part of said drive, and means for controlling said drives; substantially as described.

4. In a device of the character indicated, the combination with a driving element, an element to be driven thereby, and a plurality of controllable driving connections therebetween, said connections including members to be operated in succession to thereby render one connection inactive prior to rendering the other active, of means for controlling said connections and for moving said members in succession, such means comprising a two-armed lever carrying a contact element and having one arm operatively connected to one of said members and its other arm to an actuator, and an oscillative member operatively connected to the other member and carrying a contact element in the path of movement of said first element but spaced therefrom along said path when said lever is in initial position; substantially as described.

5. In a device of the character indicated, the combination with a driving element, an element to be driven thereby, and a plurality of controllable driving connections therebetween, said connections including members to be operated in succession to thereby render one connection inactive prior to rendering the other active, of means for controlling said connections and for moving said members in succession, such means comprising a bell crank carrying a contact element and having one arm operatively connected to one of said members and its other arm to an actuator, and an oscillative member operatively connected to the other member and carrying a contact element in the path of movement of said first element but spaced therefrom along said path when said bell crank is in initial position; substantially as described.

6. In a device of the character indicated, the combination with a driving member and a member to be driven thereby and a plurality of controllable driving connections therebetween, of means for controlling both said connections including a member to be oscillated to render one connection inactive, and provided with an arm, and a brake to be operated to render the other connection active, and means for causing a partial oscillation of the oscillative member prior to the operation of said brake, such means comprising an oscillative lever connected to said arm and carrying a contact element, an oscillative member connected to said brake to operate the same by its oscillation and carrying a contact element lying in the path of movement of the first named element and spaced therefrom along said path when the first named element is in initial position but in position to be engaged and moved by said first named element when said first named oscillative member has moved sufficiently to render the first named connection inactive; substantially as described.

7. In a device of the character indicated, the combination with a support, a driving member in the character of a cylindrical shell, a driven member, a driving connection between said members, an antifriction bearing carrying said shell upon said support and received within said shell and having its outer race member coöperative with said shell, and a second antifriction bearing carrying a portion of said driving connection upon said shell and supported upon the exterior of said shell and having its inner race member coöperative with said shell, of a common means for holding both said race members against sliding with respect to said shell; substantially as described.

8. In a device of the character indicated, the combination with a support, a driving member in the character of a cylindrical shell, a driven member, a driving connection between said members, an antifriction bearing carrying said shell upon said support and received within said shell and having its outer race member coöperative with said shell, and a second antifriction bearing carrying a portion of said driving connection upon said shell and supported upon the exterior of said shell and having its inner race member coöperative with said shell, of a member received within said shell for holding both said race members against shifting with respect to said shell; substantially as described.

9. In a device of the character indicated, the combination with a support, a driving member in the character of a shell rotatably carried upon said support, a driven member, a high-speed and a low-speed driving connection between said members, one of said connections comprising an element rotatably carried upon the exterior of said driving member, an antifriction bearing carrying said driving member upon said support, such bearing comprising an outer race-member in contact with the interior surface of said driving member, and an antifriction bearing carrying said element upon said driving member, such bearing comprising an inner race-member in contact with the exterior surface of said driving member, of a common means for holding both said race-members against sliding with respect to said driving member; substantially as described.

10. In a device of the character indicated, the combination with a support, a driving member rotatably carried upon said support, a driven member, gearing connecting said members and including a gear carried by said driving member, an antifriction bearing carrying said driving member upon said support and having a race member to be held in position with respect to such driving member, a carrying member for carrying a portion of said gearing and rotatable about said driving member, an antifriction bearing between said carrying member and said driving member, and a member providing said gear and a race member of said second named antifriction bearing, of a member located and positioned for holding both said race members and said gear in position with respect to said driving member; substantially as described.

11. In a device of the character indicated, in combination, a hollow driving member, a driving shaft fast connected with said member and projecting longitudinally within, and having radial clearance relative to, the same, a driven member carried upon said driving member, a controllable driving connection between said two members and including a member shiftable to control said connection, means for shifting said shiftable member, and means connecting said shifting means with said shiftable member and including an element shiftable longitudinally within said driving member, such element being sufficiently radially distant from the axis of said shaft to permit the element to overlie said shaft in the element's shifting movements; substantially as described.

12. In a device of the character indicated, in combination, a hollow driving member, a driving shaft connected with the member and projecting longitudinally within the same, a fastening device upon said shaft and within the member for connecting said member to said shaft and having radial clearance relative to the member, a driven member carried upon said driving member, a controllable driving connection between said two members and including a member shiftable to control such connection, means for shifting said shiftable member, and means connecting said shifting means and said shiftable member and including an element shiftable longitudinally within said driving member, such element being sufficiently radially distant from the axis of said shaft to permit the element to overlie said device in the element's shifting movements; substantially as described.

13. In a device of the character indicated, in combination, a hollow driving member, a driving shaft fast connected with said member and projecting longitudinally within, and having radial clearance relative to, the same, a driven member carried upon said driving member, a controllable driving connection between said two members and including a member shiftable to control said connection, means for shifting said shiftable member, and means connecting said shifting means and said shiftable member and including a ring shiftable longitudinally within said driving member, such ring being sufficiently radially distant from the axis of said shaft to permit the ring to overlie said shaft in the ring's shifting movements; substantially as described.

14. In a device of the character indicated, in combination, a hollow driving member, a driving shaft connected with the member and projecting longitudinally within the same, a nut upon said shaft and within the member for connecting said member to said shaft and having radial clearance relative to the member, a driven member carried upon said driving member, a controllable driving connection between said two members and including a member shiftable to control said connection, means for shifting said shiftable member, and means connecting said shifting means and said shiftable member and including a ring shiftable longitudinally within said driving member, such ring being sufficiently radially distant from the axis of said shaft to permit the ring to overlie said nut in the ring's shifting movements; substantially as described.

15. In a device of the character indicated, in combination, a driving shaft, a driving member in the character of a sleeve having an inwardly projecting flange to be sleeved upon said shaft for connection therewith, a nut upon said shaft and received within said driving member to one side of said flange to connect said driving member and shaft, a driven member carried upon said driving member, a driving connection between said two members and including a member shiftable to control said connection, means for shifting said shiftable member, and means connecting said shifting means and said shiftable connection, such last named means including an element passing from said shiftable member through said driving member and a ring carried by said element within said driving member and surrounding said nut; substantially as described.

In testimony whereof, I hereunto affix my signature, in the presence of two witnesses.

VICTOR W. PAGÉ.

Witnesses:
JOSEPH D. BROWN,
VERNER A. GREENE.